United States Patent [19]

Ueno et al.

[11] Patent Number: 4,504,349
[45] Date of Patent: Mar. 12, 1985

[54] METHOD FOR IMPARTING IMPROVED SURFACE PROPERTIES TO A POLYMERIC SHAPED ARTICLE

[75] Inventors: Susumu Ueno; Hideaki Kamata, both of Ibaraki, Japan

[73] Assignee: Shin-Etsu Chemical Co., Ltd., Japan

[21] Appl. No.: 533,534

[22] Filed: Sep. 19, 1983

[30] Foreign Application Priority Data

Sep. 20, 1982 [JP] Japan .................. 57-163680

[51] Int. Cl.³ .................. B29C 19/02; B29C 17/08
[52] U.S. Cl. .................. 156/272.6; 156/629; 156/643; 156/646; 156/668; 427/40
[58] Field of Search .......... 156/645, 646, 668, 629, 156/272.6; 427/39, 40, 41; 204/164, 192 EC, 192 E

[56] References Cited
U.S. PATENT DOCUMENTS 4,382,101  5/1983  Polak .................. 427/40
4,400,424  8/1983  Hatada et al. .................. 427/40

Primary Examiner—William A. Powell
Attorney, Agent, or Firm—Toren, McGeady and Stanger

[57] ABSTRACT

The invention provides a novel method for improving the surface properties or, in particular, the susceptibility to adhesive bonding of a shaped article of a synthetic polymer having aromatic rings and nitrogen atoms in the backbone chain of the polymer molecule, such as polyimides, polyamidoimides and polyaramides, so that the mechanical strengths of a resinous composite material reinforced with such a shaped article, e.g. fibers and cloths, may be greatly improved. The method comprises subjecting the surface of the shaped article to exposure to low temperature plasma of an inorganic, in particular, oxidizing gas generated by the glow discharge between electrodes under a reduced pressure, the discharge voltage between the electrodes being at least 4000 volts.

6 Claims, 1 Drawing Figure

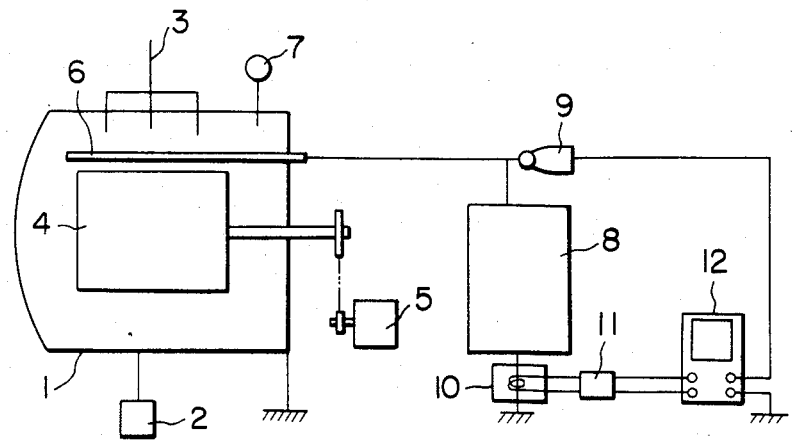
FIGURE

METHOD FOR IMPARTING IMPROVED SURFACE PROPERTIES TO A POLYMERIC SHAPED ARTICLE

BACKGROUND OF THE INVENTION

The present invention relates to a method for imparting improved surface properties to a polymeric shaped article or, more particularly, to a method for imparting improved susceptibility to adhesive bonding to a shaped body of a synthetic polymer having aromatic rings and nitrogen atoms in the backbone chain of the polymer molecule.

There are known several industrially important synthetic polymers having aromatic rings and nitrogen atoms in the backbone chain of the polymer molecule including various kinds of polyimides, polyamidoimides, polyaramides, i.e. aromatic polyamides, and the like (hereinafter referred to as nitrogen-containing aromatic polymers). Shaped articles of these synthetic polymers are excellent in various properties such as mechanical strengths, electric properties, heat and cold resistance, wearing resistance, lightness, moldability, resistance against chemicals, intoxicity and the like so that they are useful as electric insulating materials, parts for electric and mechanical instruments, sound insulating materials, laminated plates, sandwich panels, boards, carpets, woven cloths, protection wears, heat-insulating wears, belts, tire cords for automobiles, ropes and the like materials in a variety of fields.

There are many applications, meanwhiile, in which the shaped articles of these polymers are used as a component of a composite material as integrally combined with the other types of polymeric materials in addition to the applications in which the shaped articles of these polymers are separately used as such in the forms of films, plates, tubes and the like. When such a combined use as a component of a composite material is intended, firmness in adhesive bonding is essential between the nitrogen-containing aromatic polymer and the other polymer combined therewith whereas the conventional nitrogen-containing aromatic polymers are defective in this respect so that composite materials formed thereof are sometimes inferior in the mechanical and electric properties with the advantages expected to the composite structure exhibited not to a full extent. For example, the polymers or, in particular, polyaramide resins are excellent as a polymeric material in the mechanical and electric properties and useful as a reinforcing material for another synthetic resin as a matrix in the forms of single filaments, chopped yarns, woven cloths and the like while a problem sometimes noted in such an application is the poor adhesive bonding between the matrix resin and the reinforcing material so that improvement in this regard has been eagerly desired.

Of course, there have been made various attempts and proposals for the improvement of the adhesive bonding in these reinforcing materials including a method of treating the material in advance with an acid or alkali, a method of providing an undercoating to the reinforcing material with another resin susceptible to firm adhesive bonding and a method of subjecting the surface of the reinforcing material to be treatment with corona discharge although none of these methods is quite effective for the purpose.

SUMMARY OF THE INVENTION

An object of the present invention is therefore to provide a novel and improved method for imparting improved surface properties or, in particular, improved susceptibility to adhesive bonding to a shaped article of a synthetic polymer having aromatic rings and nitrogen atoms in the backbone chain of the polymer molecule.

The method of the present invention established as a result of the extensive investigations undertaken by the inventors with the above object comprises subjecting the surface of the shaped article of the nitrogen-containing aromatic polymer to exposure to the atmosphere of low temperature plasma of an inorganic gas, preferably oxygen or an oxygen-containing gas, of reduced pressure generated by the glow discharge with application of an electric voltage between the electrodes, the discharge voltage between the electrodes being at least 4000 volts.

The above described inventive method is so effective in improving the susceptibility of the surface of the polymer to adhesive bonding with other synthetic resins that the composite materials prepared with the thus treated polymer in the form of single filaments, chopped yarns or woven cloths have very much improved mechanical and electric properties in comparision with conventional similar products.

BRIEF DESCRIPTION OF THE DRAWING

The FIGURE is a schematic illustration of an apparatus used in the inventive method.

DETAILED DESCRIPTION OF THE PREFERRED EMBODIMENTS

The shaped body as the objective material of the inventive method is made of a synthetic polymer having aromatic rings and nitrogen atoms constituting the backbone chain of the polymer molecule. Such a polymer may have a structure of polyimide, polyimidoamide or polyaramide though not limited thereto. The forms of the shaped article are not particularly limitative including films, sheets, plates, tubes and various vessels as well as fibrous forms such as single filaments, chopped or unchopped yarns and strands and woven and non-woven cloths.

The inventive method for imparting the above mentioned shaped article with improved surface properties is performed by subjecting the surface of the shaped article to exposure to an atmosphere of low temperature plasma of an inorganic gas under reduced pressure generated in a space through which the inorganic gas is flowing. The inorganic gases suitable in the inventive method include helium, neon, argon, nitrogen, oxygen, air, nitrous oxide, nitrogen monoxide, nitrogen dioxide, carbon monoxide, carbon dioxide, bromine cyanide, sulfur dioxide, hydrogen sulfide and the like. These inorganic gases may be used either alone or as a mixture of two kinds or more according to need. It is preferable in the present invention that the inorganic gas constituting the plasma atmosphere is oxygen or a gaseous mixture containing at least 10% by volume of oxygen in view of the higher effectiveness of the plasma treatment. Organic gases may be contained in the plasma atmosphere although the concentration thereof should be limited.

The pressure of the inorganic gas in the plasma atmosphere should be in the range from 0.001 to 100 Torr or, preferably, from 0.01 to 1 Torr. When an electric power of 10 watts to 100 kilowatts at a high frequency of 10 kHz to 100 MHz is supplied to the electrodes installed in the space kept under the above mentioned reduced pressure, electric discharge readily takes place within the space to form an atmosphere of low temperature plasma. The frequency band of the electric power is not particularly limited to the above mentioned high frequency range but may be direct current or low frequency to microwave range although the high frequency range is preferred.

The arrangement of the discharge electrodes is not particularly limitative in the apparatus for the plasma treatment although it is preferable that the electrodes are installed inside the plasma chamber. The electrodes may be installed outside the plasma chamber or a single coiled electrode is provided surrounding the plasma chamber. The electrodes are connected to the power source, e.g. high frequency generator, either by capacitance coupling or by inductance coupling and one or a set of the electrodes, when two sets of electrodes are provided, should usually be grounded, the other electrode or the other set of electrodes being a power electrode or a set of power electrodes. The forms of the electrodes are also not particularly limitative including plate-like, ringwise, rod-like and cylindrical forms and the grounded and power electrodes may have the same form or different forms each from the other. A convenient disposition of the electrodes is that the walls of the plasma chamber are made of a metal to serve as the grounded electrode and a metal-made electrode of rod-like or other form held inside the plasma chamber serves as the power electrode.

The low temperature plasma to which the shaped article is exposed in the inventive method can be readily generated by the glow discharge within the space kept under a reduced pressure of an inorganic gas by applying a suitable discharge voltage between the discharge electrodes. It has been unexpectedly discovered that the value of this discharge voltage is very significant and should be at least 4000 volts so that the polymeric shaped article, e.g. films, single filaments, chopped yarns and woven cloths, having been exposed to the low temperature plasma can be imparted with remarkably improved susceptibility to adhesive bonding. The effectiveness of the plasma treatment is further increased when the discharge voltage is increased from 4000 volts to 10,000 volts or higher correspondingly while the effectiveness may be insufficient, if not ineffective, with a discharge voltage lower than 4000 volts unless the treatment is unduly prolonged to cause economical disadvantages. The discharge voltage has no particular upper limit although it should be taken into consideration that an excessively high discharge voltage necessarily is accompanied by the problems of heat evolution which may adversely affect the properties of the polymeric shaped article under treatment if not to mention the economical disadvantage due to the increased energy loss.

It should be noted that, in order to increase the discharge voltage to 4000 volts or higher, the power electrode should be provided with an insulating coating with sufficient dielectric strength since application of a high voltage between the electrodes with the metal, e.g. copper, iron or aluminum, surfaces exposed bare may lead to the predominance of the discharge current limiting the discharge voltage to about 1000 volts at the highest. In such a condition of the electrode insulation, the desired effect of the improvement in the adhesive bonding can of course be hardly expected for the shaped articles of the nitrogen-containing aromatic resins.

The material for the insulating coating on the surface of the electrode made of a metal, e.g. copper, iron and aluminum, should preferably be a porcelain enamel, glass or ceramic from the standpoint of heat resistance and the dielectric strength thereof should preferably be 10,000 volts/mm or higher as measured with D.C. voltage application.

In addition to the above mentioned conditions of the discharge voltage of 4000 volts or higher and the reduced pressure of the atmosphere in the range from 0.001 to 10 Torr, further desirable conditions are that the density of the power consumption should be at least 2.5 watts/cm$^2$ on the surface of the power electrode and the distance between the grounded and power electrodes should be in the range from 1 to 20 cm in order to obtain stable glow discharge for generating low temperature plasma within the space of the plasma chamber. When the pressure of the gaseous atmosphere exceeds 10 Torr, an unduly large electric power is necessitated to generate low temperature plasma with large heat evolution while the electric discharge may be unstable when the pressure of the gaseous atmosphere is smaller than 0.001 Torr. When the density of the power consumption is smaller than 2.5 watts/cm$^2$, the discharge voltage as high as desired can hardly be maintained so that the effect of improving adhesive bonding may be insufficient. When the distance between the grounded and power electrodes is smaller than 1 cm, the polymeric shaped articles under treatment sometimes suffer the adverse effect of the heat evolved on the surface of the electrodes while an excessively large distance between the electrodes over 20 cm is undesirable due to the disadvantages caused by the large size of the apparatus as well as the large power consumption with unduly large energy loss.

It should be noted that the effect of the treatment with low temperature plasma generated by the glow discharge is limited to the very surface of the shaped article as an inherent characteristic so that, despite the profound improvement or modification in the surface properties, the polymeric shaped article can retain the advantageous properties of the bulk body inherent to the polymeric material. For example, the shaped article of the nitrogen-containing aromatic polymer is imparted with greatly improved susceptibility to adhesive bonding without decrease in the mechanical strengths so that a composite material made of the plasma-treated reinforcing material such as filaments, yarns and cloths may have remarkably improved mechanical and electrical properties by virtue of the improvement in the adhesive bonding between the matrix resin and the reinforcing material. In some cases, the shearing strength of the composite material manufactured of the plasma-treated reinforcing material may be increased by almost 200% over that of the similar composite material manufactured of the same reinforcing material but not treated by the low temperature plasma.

Following are the examples to illustrate the procedure and effectiveness of the inventive method in more detail but not to limit the scope of the invention in any way.

The apparatus used in the following examples is schematically illustrated by the accompanying FIGURE. The drumwise plasma chamber 1 is made of a stainless steel and can be evacuated by means of the vacuum pump 2 connected thereto to a vacuum of 0.001 Torr or below of the pressure. The plasma chamber 1 is also connected to a gas inlet 3 opening inside the chamber 1. It is optional according to need that the end of the gas inlet 3 is divided in manifold (in three branches in the FIGURE) with an object to ensure uniformity of the atmospheric conditions inside the plasma chamber 1. Inside the plasma chamber 1, a rotatable cylindrical electrode 4 made also of a stainless steel is provided as supported vacuum-tightly in a cantilever manner by a shaft penetrating the face plate of the plasma chamber 1 in such a manner that this cylindrical electrode can be rotated by means of the electric motor 5 approximately coaxially with the drum-wise plasma chamber 1 at a controllable velocity of rotation. This cylindrical electrode 4 is electrically grounded through the plasma chamber 1. In order to facilitate control of the temperature of the plasma treatment, a heating or cooling medium can be passed through inside of this rotatable cylindrical electrode 4. Further, a rod-like electrode 6, which serves as the power electrode, is provided inside the plasma chamber 1 in parallel with the axis of rotation of the cylindrical electrode 4 to form a gap of uniform width therebetween as electrically insulated from the plasma chamber 1 or the cylindrical electrode 4. The pressure inside the plasma chamber 1 is measured with a Pirani gauge 7 connected to the chamber 1.

The power electrode 6 is connected to the power output terminal of a high frequency generator 8, the other terminal thereof being grounded, to apply a high frequency voltage between the grounded electrode 4 and the power electrode 6. The discharge voltage between the grounded and power electrodes 4,6 can be determined by means of a high-voltage probe 9 connected to a two-channel synchroscope 12 which also serves to determine the discharge current between the electrodes 4,6 by means of a current probe 10 connected thereto through a termination 11.

In the above described metering assembly for high frequency power supply, the peak-to-peak value of the discharge voltage ($V_{p-p}$) is readily determined from the voltage shown by the amplitude of the image for the corresponding channel on the screen of the synchroscope 12 and multiplied by the reciprocal of the attenuation ratio in the high-voltage probe 9 while the discharge current is determined from the amplitude of the image for the second channel on the screen of the synchroscope 12 as multiplied by the sensitivity of the termination 11. The phase difference between the discharge voltage and the discharge current can be determined from the displacement between the wave forms for the voltage and current shown on the screen of the two-channel synchroscope 12.

Assuming an ideal sine wave for each of the discharge voltage and current, then the electric power of the discharge is given by the equation:

$$P = (E/2\sqrt{2}) \cdot (I/2\sqrt{2}) \cdot \cos\phi = (EI/8) \cdot \cos\phi,$$

in which P is the electric power of discharge in watts, E is the (peak-to-peak) discharge voltage in volts, I is the (peak-to-peak) discharge current in amperes and $\phi$ is the phase difference between the discharge voltage and current.

EXAMPLE 1

A plain-woven cloth of a polyaramide fiber (Kevlar 49, Type 28 manufactured by Du Pont Co.) was applied to the rotatable cylindrical electrode 4 of the above described apparatus for the low temperature plasma treatment to cover the surface thereof and the plasma chamber 1 was evacuated by means of the vacuum pump 2. When the pressure inside the chamber 1 had reached 0.001 Torr, continuous introduction of a gaseous mixture of oxygen and argon was started through the gas inlet 3 at the rates of 700 N ml/minute of oxygen and 300 N ml/minute of argon so that the pressure inside the chamber 1 was kept constant at 0.6 Torr by the balance of the continuous evacuation and introduction of the gaseous mixture.

When a high frequency voltage at a frequency of 110 kHz was applied between the grounded cylindrical electrode and the rod-like power electrode held apart to form a gap of a uniform width of 4 cm, low temperature plasma was generated in the space inside the plasma chamber 1. In applying the high frequency voltage, the value of the peak-to-peak voltage in each of the runs was varied in the range from 2000 to 10,000 volts as read on the synchroscope by controlling the power input in the range from 1.3 to 15.5 kilowatts as shown in Table 1 below. Since the electrode had an effective surface area for discharge of 500 cm$^2$, the density of the discharge power per unit area was in the range from 2.6 to 31 watts/cm$^2$ as shown in Table 2. With the above described conditions for the discharge, the duration of the plasma treatment was varied so that the integrated overall energy output per unit area of the discharge surface of the electrode was 40, 80, 160, or 320 watts·seconds/cm$^2$.

Each of the thus plasma-treated woven cloths of the polyaramide fiber was used as a reinforcing material of an epoxy resin (BP-907 manufactured by American Cyanamid Co.) to form a cloth-reinforced resin sheet by the techniques of vacuum bag molding followed by curing at 175° C. for 1 hour in an autoclave. The volume ratio of the reinforcing cloth in this composite sheet was about 40%. The thus prepared composite sheets were subjected to the measurement of the tensile strength according to the procedure specified in JIS K 7113 to give the results shown in Table 1. A comparative value of the tensile strength obtained with a similar composite sheet prepared with the same woven cloth before plasma treatment was 3000 kg/cm$^2$.

As is clear from the results shown in Table 1, the tensile strength of the epoxy-based composite sheet can be remarkably increased by the low temperature plasma treatment of the polyaramide cloth as the reinforcing material and the effect is more remarkable when the discharge voltage in the plasma treatment is increased over 4000 volts even with a relatively small integrated overall energy output per unit area while the effect is less remarkable with the discharge voltage of 2000 or 3000 volts indicating the criticality of the discharge voltage of 4000 volts.

TABLE 1

| Peak-to-peak voltage, volts | Power, kW | Power density, W/cm$^2$ | Integrated energy output, W · sec/cm$^2$ | | | |
|---|---|---|---|---|---|---|
| | | | 40 | 80 | 160 | 320 |
| 2000 | 1.3 | 2.6 | 3000 | 3050 | 3100 | 3100 |
| 3000 | 2.1 | 4.2 | 3100 | 3200 | 3300 | 3300 |
| 4000 | 3.1 | 6.2 | 3200 | 3500 | 4400 | 4000 |
| 5000 | 4.2 | 8.4 | 3900 | 5100 | 7400 | 7600 |
| 7000 | 7.1 | 14.2 | 5100 | 6200 | 7700 | 7900 |

TABLE 1-continued

| Peak-to-peak voltage, volts | Power, kW | Power density, W/cm² | Integrated energy output, W · sec/cm² | | | |
|---|---|---|---|---|---|---|
| | | | 40 | 80 | 160 | 320 |
| 10000 | 15.5 | 31 | 6200 | 7200 | 8000 | 8200 |

(tensile strength in kg/cm²)

EXAMPLE 2

The same polyaramide cloth as used in Example 1 was subjected to the treatment with low temperature plasma in about the same manner as in Example 1 with some modifications in the conditions. When the plasma chamber containing the cloth held on the cylindrical electrode was evacuated and the pressure inside had reached 0.001 Torr, oxygen gas was continuously introduced into the plasma chamber at a rate of 500 N ml/minute so that the pressure inside the chamber was maintained at 0.4 Torr by the balance of the continuous evacuation and introduction of the gas. The high frequency power supply to the electrodes was controlled so that the peak-to-peak discharge voltage between the electrodes was varied from 2000 to 20,000 volts in each of the epxeriments. The discharge voltage, power input and density of power input per unit area of the power electrode having an effective surface area of 500 cm² are shown in Table 2. The plasma discharge was continued until the integrated overall energy input per unit surface area of the discharge electrode reached 320 watts·seconds/cm² in each of the experiments.

The thus plasma-treated polyaramide cloths were processed into epoxy resin-based composite sheets in the same manner as in the preceding example and these composite sheets were subjected to the measurement of the tensile strength also in the same manner as in the preceding example to give the results shown in Table 2. Meanwhile, the tensile strength of the composite sheet prepared with the same polyaramide cloth before plasma treatment was 3000 kg/cm².

As is clear from these results, the effect of the improvement in the mechanical properties of the composite sheets is insignificant when the peak-to-peak discharge voltage between the electrodes is 3000 volts or lower.

TABLE 2

| Peak-to-peak voltage, volts | Power, kW | Power density, W/cm² | Tensile strength, kg/cm² |
|---|---|---|---|
| 2000 | 1.4 | 2.8 | 3300 |
| 3000 | 2.2 | 4.4 | 3600 |
| 4000 | 3.3 | 6.6 | 4500 |
| 5000 | 4.4 | 8.8 | 6500 |
| 7000 | 7.5 | 15.0 | 8000 |
| 10000 | 16.5 | 33.0 | 8500 |
| 20000 | | | 9000 |

EXAMPLE 3

The same polyaramide cloth as used in Example 1 was subjected to the treatment with low temperature plasma in about the same manner as in Example 1 with some modifications in the conditions. When the plasma chamber containing the cloth held on the cylindrical electrode was evacuated and the pressure inside had reached 0.001 Torr, a gaseous mixture of oxygen and nitrogen in a varied mixing ratio shown in Table 3 was introduced into the plasma chamber at a rate of 100 N ml/minute so that the pressure inside the plasma chamber was maintained at 0.1 Torr by the balance of the continuous evacuation and introduction of the gaseous mixture.

Low temperature plasma was generated in the plasma chamber by supplying a high frequency electric power at a frequency of 100 kHz with a peak-to-peak discharge voltage of 7000 volts between the grounded cylindrical electrode and the power electrode held to form a gap of 4 cm width. The low temperature plasma treatment was continued for 20 seconds in each of the experiments.

The thus plasma-treated polyaramide cloths were processed into epoxy resin-based composite sheets just in the same manner as in Example 1 and the composite sheets were subjected to the measurement of the tensile strength to give the results shown in Table 3. Meanwhile, the tensile strength of the composite sheet prepared with the same polyaramide cloth before plasma treatment was 3000 kg/cm².

As is clear from the results shown in Table 3, the content of oxygen in the atmosphere is very significant and the content of oxygen in the oxygen-nitrogen mixture is preferably at least 10% by volume in order to obtain sufficient effects of desired improvements.

TABLE 3

| Volume ratio in gaseous mixture, oxygen/nitrogen | Tensile strength, kg/cm² |
|---|---|
| 0/100 | 3800 |
| 5/95 | 3900 |
| 10/90 | 7300 |
| 20/80 | 7600 |
| 40/60 | 8000 |
| 60/40 | 8200 |
| 80/20 | 8100 |
| 90/10 | 8100 |
| 100/0 | 8000 |

What is claimed is:

1. A method for imparting improved surface properties to a shaped article of a synthetic polymer having aromatic rings and nitrogen atoms in the backbone chain of the polymer molecule which comprises subjecting the surface of the shaped article to exposure to the atmosphere of low temperature plasma of an inorganic gas under a reduced pressure generated by glow discharge with application of an electric voltage between a grounded electrode and a power electrode, the discharge voltage between the electrodes being at least 4000 volts.

2. The method as claimed in claim 1 wherein the inorganic gas is oxygen or a gaseous mixture containing at least 10% by volume of oxygen.

3. The method as claimed in claim 1 wherein the reduced pressure is in the range from 0.001 to 10 Torr.

4. The method as claimed in claim 1 wherein the surface of the electrode is coated with a heat-resistant, electrically insulating material.

5. The method as claimed in claim 1 wherein the grounded electrode and the power electrode are apart from each other at a distance from 1 to 20 cm.

6. The method as claimed in claim 1 wherein the density of the electric power on the surface of the power electrode is at least 2.5 watts/cm².

* * * * *